(12) United States Patent
Hofmann

(10) Patent No.: US 7,095,985 B1
(45) Date of Patent: Aug. 22, 2006

(54) RADIO TRANSMITTER AND RECEIVER

(75) Inventor: Ludwig Hofmann, Ilmmuenster (DE)

(73) Assignee: Siemens Aktiengesellschaft, Munich (DE)

( * ) Notice: Subject to any disclaimer, the term of this patent is extended or adjusted under 35 U.S.C. 154(b) by 449 days.

(21) Appl. No.: 10/031,457

(22) PCT Filed: Jul. 19, 2000

(86) PCT No.: PCT/DE00/02361

§ 371 (c)(1),
(2), (4) Date: May 30, 2002

(87) PCT Pub. No.: WO01/08318

PCT Pub. Date: Feb. 1, 2001

(30) Foreign Application Priority Data

Jul. 22, 1999 (DE) ................................. 199 34 502

(51) Int. Cl.
*H04B 1/44* (2006.01)
(52) U.S. Cl. ............................. 455/78; 455/75; 455/82; 455/83; 455/84
(58) Field of Classification Search .................. 955/84, 955/75, 76, 78, 115.1, 82, 83
See application file for complete search history.

(56) References Cited

U.S. PATENT DOCUMENTS

| 3,696,429 | A | | 10/1972 | Tressa |
| 4,535,476 | A | | 8/1985 | Carlin |
| 5,444,864 | A | | 8/1995 | Smith |
| 5,991,605 | A | * | 11/1999 | Rapeli ........................ 455/76 |
| 6,006,112 | A | * | 12/1999 | Rucki et al. ................ 455/561 |
| 6,289,205 | B1 | * | 9/2001 | Pollanen et al. ............ 455/126 |

* cited by examiner

*Primary Examiner*—Nick Corsaro
*Assistant Examiner*—Eugene Yun
(74) *Attorney, Agent, or Firm*—Morrison & Foerster LLP

(57) ABSTRACT

Radio transceiver, in particular, a mobile telephone having a transmitter output stage, a receiver part, a transmission/reception antenna which is assigned jointly to the transmitter output stage and the receiver part, a transmission band-transmitting filter and a reception band-transmitting filter, having a compensation element, connected between the output of the transmitter output stage and the input of the receiver part, for compensating crosstalk of a transmission signal element onto the receiver part.

6 Claims, 4 Drawing Sheets

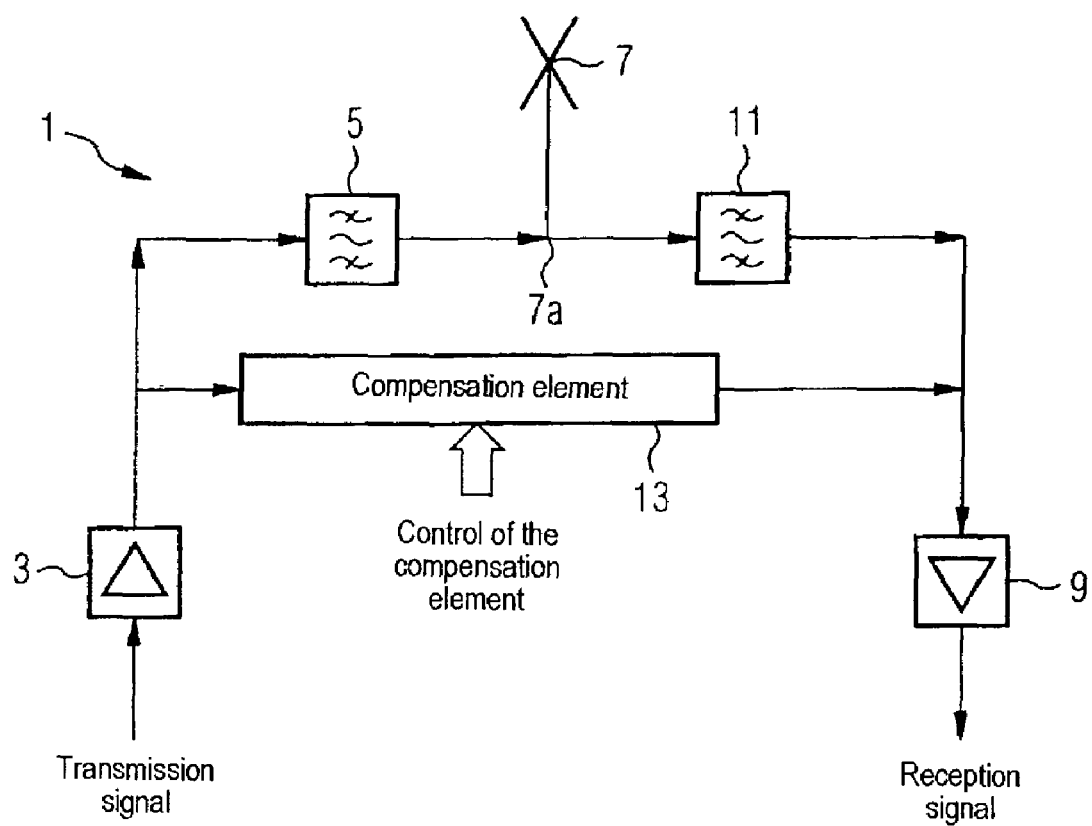

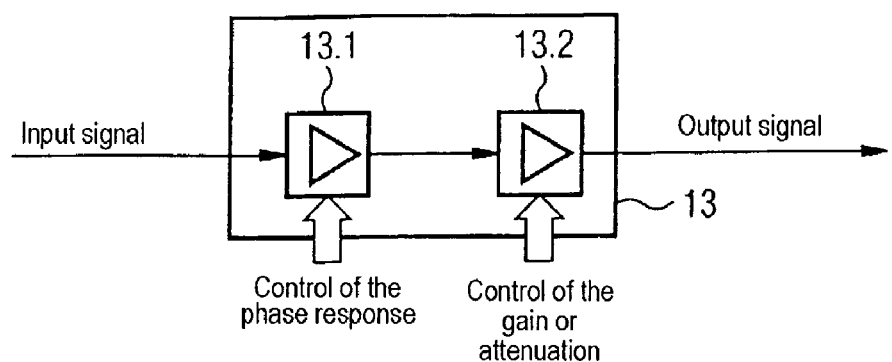
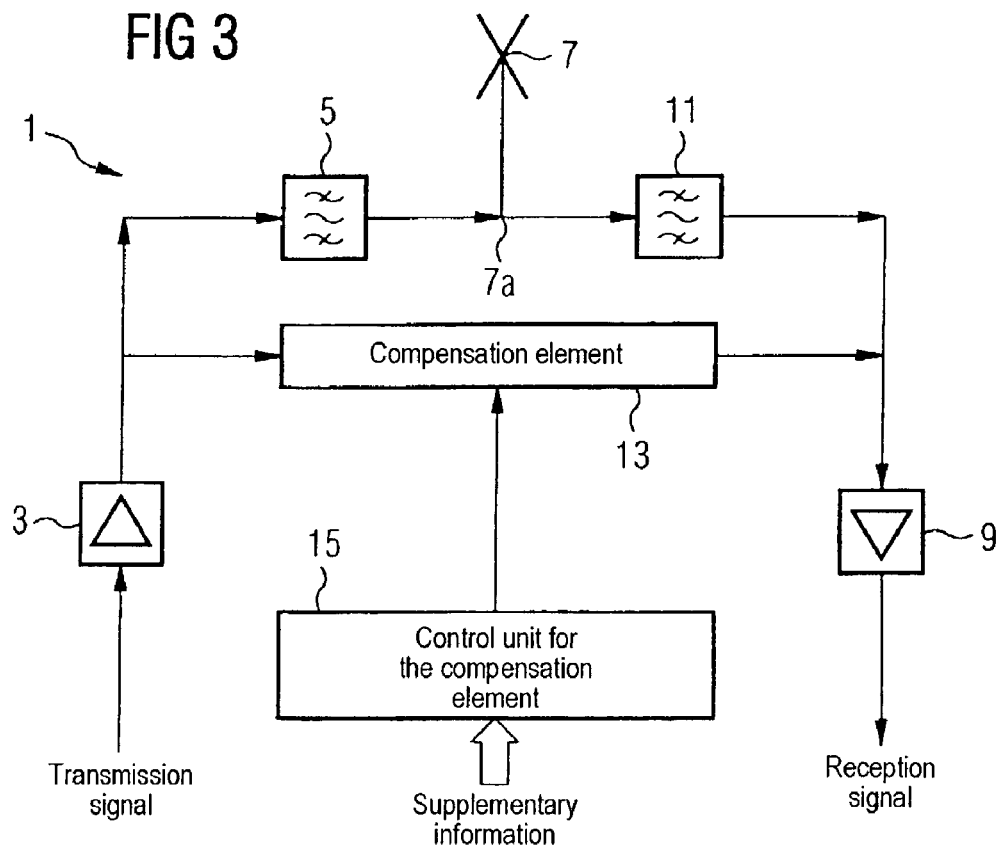

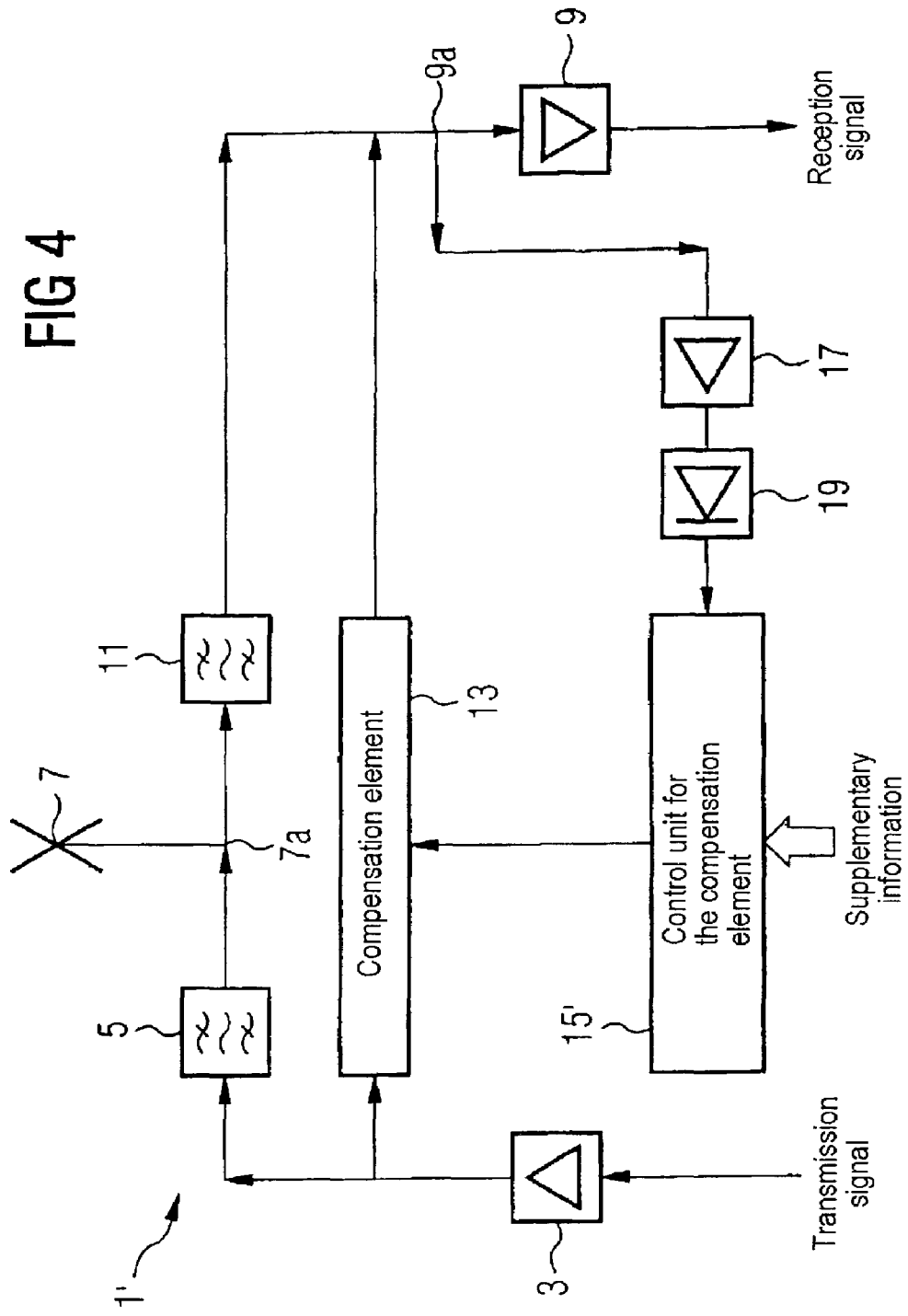

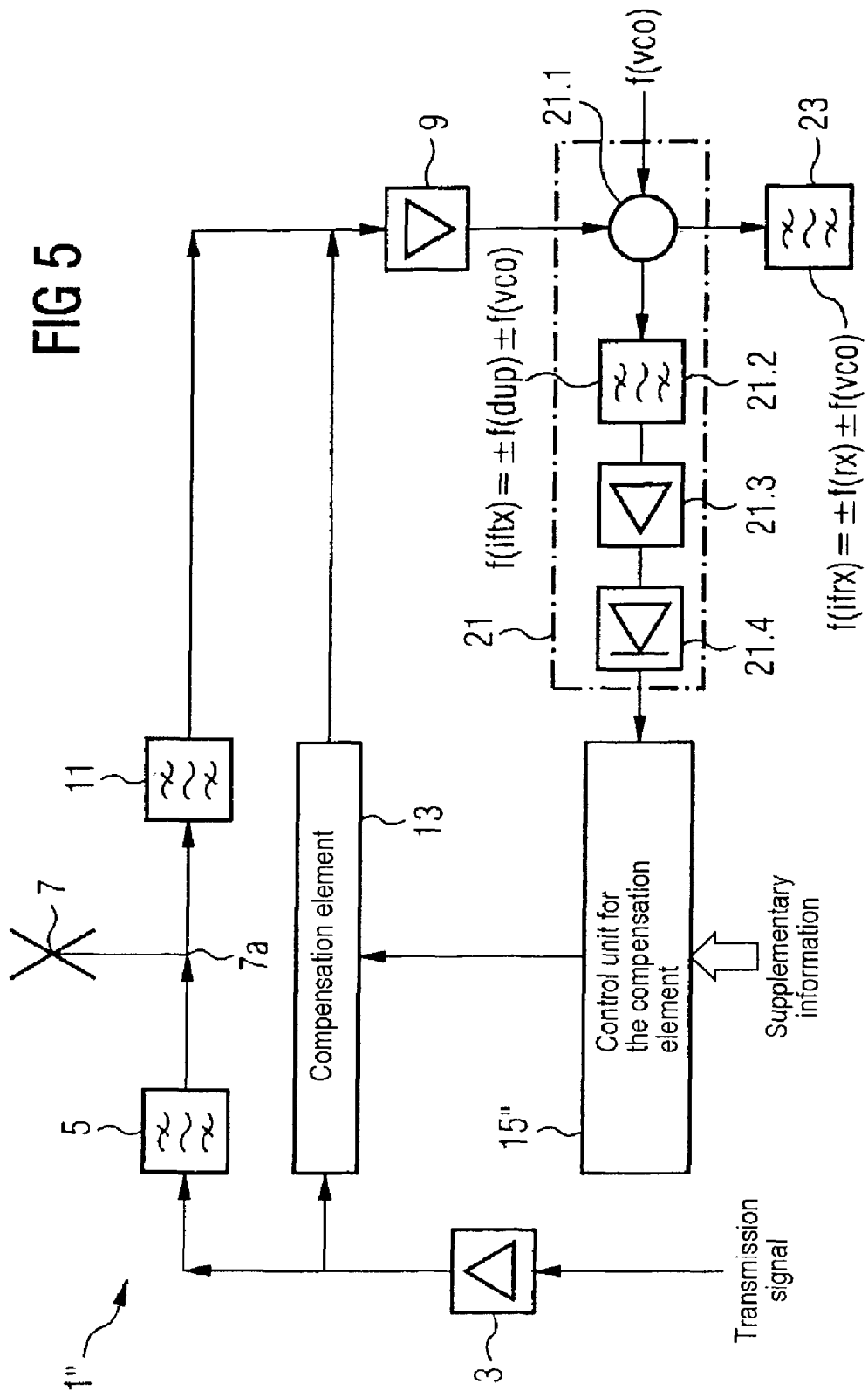

RADIO TRANSMITTER AND RECEIVER

CLAIM FOR PRIORITY

This application claims priority to International Application No. PCT/DE00/02361 which was published in the German language on Jul. 19, 2000.

TECHNICAL FIELD OF THE INVENTION

The invention relates to a radio transceiver, and in particular, to a mobile telephone.

BACKGROUND OF THE INVENTION

In the mobile telephones which are operated according to the GSM standard, the standard does not permit a permanent simultaneous transmission and reception mode. These devices can therefore be operated with a common transmission and reception antenna without the serious risk of the receiver input being overloaded by the transmission signal.

The situation with mobile phones which utilize the future UMTS standard is different. In such devices having the full duplex mode, a chronological overlap between transmission mode and reception mode is permitted and occurs during operation. Therefore, in these devices—as is generally the case with the radio transceivers with chronological overlaps between transmission mode and reception mode—an efficient decoupling is necessary between the transmitter and receiver in order to avoid overloading or even destruction of the receiver input by the high power of the transmission signal.

The conventional art uses a duplex filter or a duplexer to solve the above noted problem. This comprises two high-quality bandpass filters with steep edges. At the transmission end, a transmission filter is used to suppress the transmitter noise and possible sideband emissions. At the receiver end, a reception filter ensures very high receiver selectivity. Alternatively, the aforementioned duplexer can also be embodied as a band-stop duplexer in which the transmission filter is a band stop with a zero position in the reception band, and the reception filter is a band stop with a zero position in the transmission band.

The aforementioned filter embodiments are virtually impossible to integrate owing to their specific properties and are thus not compatible with the trend for ever smaller and more lightweight mobile phones. In addition, they are costly and also problematic in terms of the ongoing reduction of costs in this field.

SUMMARY OF THE INVENTION

In one embodiment of the invention, there is a radio transceiver which includes a transmitter output stage, a receiver part, a transmission/reception antenna which is jointly assigned to the transmitter output stage and the receiver part, a transmission band-transmitting filter which is connected between the output of the transmitter output stage and an antenna feedpoint, a reception band-transmitting filter which is connected between the antenna feedpoint and the input of the receiver part, a compensation element which is connected between the output of the transmitter output stage and the input of the receiver part and compensates crosstalk from a transmission signal element onto the receiver part and a compensation control unit to adaptively set compensation characteristics as a function of the input voltage or input power at the input of the receiver part being assigned to the compensation element, wherein a voltage measuring device which is connected to the compensation control unit measures the input voltage of the receiver part, the voltage measuring device comprising a device for IF conversion of the input signal of the receiver part, a bandpass filter which is connected downstream and an AM receiver part which is connected to its output and whose output is used to set the compensation characteristics.

In one aspect of the invention, wherein the compensation element is connected in parallel with the transmission band-transmitting filter and with the reception band-transmitting filter to the input of a reception pre-amplifier or reception mixer of the receiver part.

In another aspect of the invention, the bandpass filter is tuned to a reception frequency in narrowband fashion.

In yet another aspect of the invention, the compensation element is integrated into an RF component of the transmitter output stage or of the receiver part.

In still another aspect of the invention, the compensation element comprises highly integrated silicon technology.

In another aspect of the invention, the compensation characteristics include phase and amplitude of the output signal.

BRIEF DESCRIPTION OF THE DRAWINGS

The advantages and embodiments of the invention also emerge from the subclaims and from the following description of preferred exemplary embodiments with reference to the figures, of which:

FIG. 1 shows a schematic view of a first embodiment of the invention in the form of a functional block circuit diagram.

FIG. 2 shows a schematic view explaining the control of the compensation element from FIG. 1.

FIG. 3 shows a schematic view of a second embodiment of the invention in the form of a functional block circuit diagram.

FIG. 4 shows a schematic view a third embodiment of the invention in the form of a functional block circuit diagram.

FIG. 5 shows a schematic view of a fourth embodiment of the invention in the form of a functional block circuit diagram.

DETAILED DESCRIPTION OF THE PREFERRED EMBODIMENTS

The invention discloses a radio transceiver with improved transmitter/receiver decoupling, which in particular requires less space and less expenditure for this function.

The invention includes a transmitter/receiver decoupling in a radio transceiver which operates with frequency-division multiplexing by compensating the transmission signal element present at the receiver input. This makes it possible to dispense with transmission and reception filters which have steep edges and cannot be constructed using integrated semi-conductor technology. This makes possible an integrated and space-saving and cost-effective embodiment of the decoupling device.

The compensation element is connected in parallel with a transmission band-transmitting filter and with a reception band-transmitting filter—neither of which need to satisfy any extreme requirements owing to the provision of the compensation element—and is connected to the input of a reception pre-amplifier or reception mixer of the receiver part.

The compensation element comprises a device to separately set the phase and amplitude of the signal to be processed so that it makes available an output signal which is suitable in terms of phase and amplitude for extinguishing crosstalk from a transmission signal element.

It can to this extent be permanently tuned—specifically either to a frequency or a channel or to a plurality of frequencies or channels, each channel then being assigned a set of tuning parameters and switching over between the tuning parameter sets also being performed when there is a channel change. Tuning parameters are to be understood here as a phase rotation angle and an amplitude value. This embodiment, which can also be characterized as "static" and has permanently set parameters, can be implemented in a particularly simple and cost-effective way.

However, providing the compensation element with adaptive control allows it to be adapted more flexibly to different conditions of use and is therefore preferable. With this embodiment, changes in the antenna adaptation can be compensated, which can occur, for example, as a result of contact or close proximity of the antenna to conductive objects or to the body. The adaptive control is based on a voltage measurement at the receiver input, phase and amplitude being changed in the compensation element in such a way that this measured voltage is minimized. The means which are required for adaptively controlling the compensation element can be collectively described by the term "compensation control element". In addition to the measuring device—which can also be embodied as a power measuring device—this compensation control element comprises, in one preferred embodiment, a device for IF conversion of the input signal to a separate intermediate frequency (using the pre-amplifier and mixer which are included in the receiver part), a simple bandpass filter connected downstream and a simple AM receiver part connected downstream of the latter.

Its output signal then represents the input variable of the adaptive control. The aforementioned bandpass filter is advantageously tuned to the reception frequency in narrowband fashion in order to achieve a high level of sensitivity of the control.

In one space-saving and cost-effective embodiment, the compensation element is integrated into the RF components of the transceiver, specifically in particular in the form of a highly integrated circuit (LSI or VLSI) using silicon technology.

FIG. 1 shows a schematic view of a first embodiment of the invention in the form of a functional block circuit diagram, FIG. 2 shows a schematic view explaining the control of the compensation element from FIG. 1 FIG. 3 shows a schematic view of a second embodiment of the invention in the form of a functional block circuit diagram, FIG. 4 shows a schematic view a third embodiment of the invention in the form of a functional block circuit diagram, and FIG. 5 shows a schematic view of a fourth embodiment of the invention in the form of a functional block circuit diagram.

The components of a mobile phone 1 in one embodiment of the invention and their interaction are shown in FIG. 1. A transmitter output stage 3, which receives a transmission signal at the input end, is connected at the output end via a transmission band-transmitting filter 5 to a feedpoint 7a of a combined transmission/reception antenna 7. A reception band-transmitting filter 11 is connected between the feedpoint 7a of the antenna 7 and the input of a reception pre-amplifier 9, at whose output a pre-amplified reception signal is made available. The transmission curves of the transmission band-transmitting filter 5 and of the reception band-transmitting filter 11 have a frequency spacing from one another which is predetermined by the standard of the mobile phone system. According to the GSM standard (which, however, also provides for time-division duplex between the reception and transmission mode), this spacing is, for example, 45 MHz. The two transmitting filters 5, 11 form together a duplex filter, of which, however, less is demanded in terms of the edge steepness of the filter characteristic curves with the proposed solution than is demanded with a conventional mobile phone duplex filter, and which can therefore be implemented using integrated silicon technology.

This is made possible by providing a compensation element 13 between the output of the transmitter output stage 3 and the input of the reception pre-amplifier 9. The arrow "control of the compensation element" which points to the compensation element 13 in FIG. 1 indicates in a general sense that the compensation element 13 normally does not have any permanently set, invariable compensation characteristics but can instead be controlled as a function of the predetermined input variables—for example a frequency assignment or channel assignment and/or a measurement variable detected in the arrangement (see below for details).

FIG. 2 shows that the compensation element 13 has, in a preferred embodiment, a phase compensation element 13.1 and an amplitude compensation element 13.2 which is connected in series with the latter, both compensation elements 13.1, 13.2 each receiving a specific control signal "control of the phase response" or "control of the gain or attenuation" and their transmission characteristics being set by the respective control signal.

FIG. 3 is a further illustration of the mobile phone 1, according to FIG. 1. A compensation control element 15, which receives a supplementary information item for the transmission/reception mode as input signal and which controls the compensation element 13, is also illustrated. The compensation control unit 15 can have a memory which is structured in the manner of a lookup table and in which assignments between predetermined transmission/reception frequencies or channels and suitable phase angle/amplitude response value pairs of the compensation element 13 are stored. If the mobile phone has only one possible frequency constellation or channel constellation for the transmission/reception mode, just a single pair of values is correspondingly provided. In addition, in one particularly flexible embodiment, the compensation control unit 15 can additionally process information which characterizes the state of the system at a given time; see below.

FIG. 4 shows a mobile phone 1' which is modified in comparison with FIG. 1 and in which the control unit receives and processes a supplementary information item which is tapped at the input of the reception amplifier 9. A measuring amplifier 17 and a rectifier unit 19, in which devices an additional input signal, representing the voltage present at the input of the reception pre-amplifier 9, for the compensation control unit 15 is acquired, are connected downstream of a tap point 9a. The control unit 15 is configured here in such a way that this voltage is minimized by suitably setting the phase and amplitude (on the basis of a value pair which is predetermined as a function of the frequency, as explained above).

FIG. 5 shows an embodiment of a mobile phone 1" which is modified in comparison with FIG. 4 and which, in addition to the components shown in FIG. 3 (which are provided with the same reference numerals and are not described once more here) has a simple "second receiver" 21 at the output end of the reception pre-amplifier. Said "second receiver" 21 is connected to a control input of a modified compensation control unit 15'.

The amplitude of the input signal is detected in narrow-band fashion with the second receiver 21, after which even very small values of crosstalk power can be detected and compensated. The second receiver 21 comprises a mixer 21.1 in which an intermediate frequency conversion of the reception signal present at the reception pre-amplifier 9 to a frequency f(vco) is performed, a bandpass filter 21.2, connected downstream of the latter, for carrying out simple filtering at the intermediate frequency f(iftx) and an AM receiver 21.3/21.4 which is connected downstream of the bandpass filter 21.2. In the reception signal path, a further, simple bandpass filter 23 for filtering at a second intermediate frequency f(ifrx) is connected downstream of the mixer 21.1.

The embodiment can be implemented in integrated fashion using silicon technology, which is advantageous technologically and in terms of costs and service value. In the embodiment shown in FIG. 5, the mixer 21.1 and the pre-amplifier 21.3 of the AM receiver can be implemented with a mixer and pre-amplifier which are present in any case in the receiver part, so that in this respect there is no need for additional hardware expenditure.

The embodiment of the invention is not restricted to the examples explained above but is rather also possible in refinements whose development lies within the scope of activity by a person skilled in the art.

What is claimed is:

1. A radio transceiver comprising:
   a transmitter output stage;
   a receiver part;
   a transmission/reception antenna which is jointly assigned to the transmitter output stage and the receiver part;
   a transmission band-transmitting filter which is connected between the output of the transmitter output stage and an antenna feedpoint;
   a reception band-transmitting filter which is connected between the antenna feedpoint and the input of the receiver part;
   a compensation element which is connected between the output of the transmitter output stage and the input of the receiver part and compensates crosstalk from a transmission signal element onto the receiver part; and
   a compensation control unit to adaptively set compensation characteristics as a function of the input voltage or input power at the input of the receiver part being assigned to the compensation element, wherein a voltage measuring device which is connected to the compensation control unit measures the input voltage of the receiver part, the voltage measuring device comprising a device for IF conversion of the input signal of the receiver part, a bandpass filter which is connected downstream and an AM receiver part which is connected to its output and whose output is used to set the compensation characteristics.

2. The radio transceiver as claimed in claim 1, wherein the compensation element is connected in parallel with the transmission band-transmitting filter and with the reception band-transmitting filter to the input of a reception pre-amplifier or reception mixer of the receiver part.

3. The radio transceiver as claimed in claim 1 wherein the bandpass filter is tuned to a reception frequency in narrow-band fashion.

4. The radio transceiver as claimed in claim 1, wherein the compensation element is integrated into an RF component of the transmitter output stage or of the receiver part.

5. The radio transceiver as claimed in claim 1, wherein the compensation element comprises highly integrated silicon technology.

6. The radio receiver of claim 1, wherein the compensation characteristics include phase and amplitude of the output signal.

* * * * *